United States Patent [19]
Orr

[11] Patent Number: 6,142,488
[45] Date of Patent: Nov. 7, 2000

[54] RECREATION VEHICLE STABILIZING SYSTEM

[75] Inventor: David G. Orr, Chanute, Kans.

[73] Assignee: Magna Tech, Inc., Chanute, Kans.

[21] Appl. No.: 09/108,680

[22] Filed: Jul. 1, 1998

[51] Int. Cl.$^7$ .................................................. B60S 9/02
[52] U.S. Cl. ..................................... 280/6.153; 280/6.154
[58] Field of Search ........................... 280/6.153, 6.155, 280/762, 727, 763.1, 766.1; 254/418; 209/421; 296/156, 162, 26.03, 26.09, 26.13; 108/50.01; 182/115, 20; 248/352, 122.1, 177.1, 188.6

[56] References Cited

U.S. PATENT DOCUMENTS

| | | | |
|---|---|---|---|
| 4,084,789 | 4/1978 | Francis | 254/86 R |
| 4,708,362 | 11/1987 | Raetz | 280/763.1 |
| 4,905,953 | 3/1990 | Wilson | 248/352 |
| 5,197,311 | 3/1993 | Clark | 70/232 |
| 5,433,459 | 7/1995 | Liu | 280/30 |
| 5,575,492 | 11/1996 | Stone | 280/475 |
| 5,758,918 | 6/1998 | Schneider et al. | 296/26 |

Primary Examiner—Brian L. Johnson
Assistant Examiner—Tony Winner
Attorney, Agent, or Firm—McCaleb, Lucas & Brugman

[57] ABSTRACT

A stabilizing apparatus for rigidifying tubular, slide-out compartment support systems used in recreational vehicles and trailers. This apparatus employs one or more extensible tubular leg assemblies capable of being locked at selected lengths to fit terrain of the parked vehicle. Pairs of legs are adapted to form an A-frame in which the apex of the A is securely clamped to a single tubular slide out or underframe member. The legs are usually spread at an angle of 25–60° from the vertical with foot pads at their outer ends substantially parallel to the ground level. Once so positioned the outer, lower ends of the spread legs are interconnected by a flexible strap equipped with a rachet tensioner or come along device whereby the strap may be tensioned to place the engaged attachment bracket under compression serving thereby to stabilize the slide out against lateral sway or movement. In other instances where the slide out compartment in supported on two or more laterally spaced slide rails, a single leg is clamped at an angle to each of such rails and then tensioned by the ratchet strap to laterally stabilize the slide out structure.

2 Claims, 4 Drawing Sheets

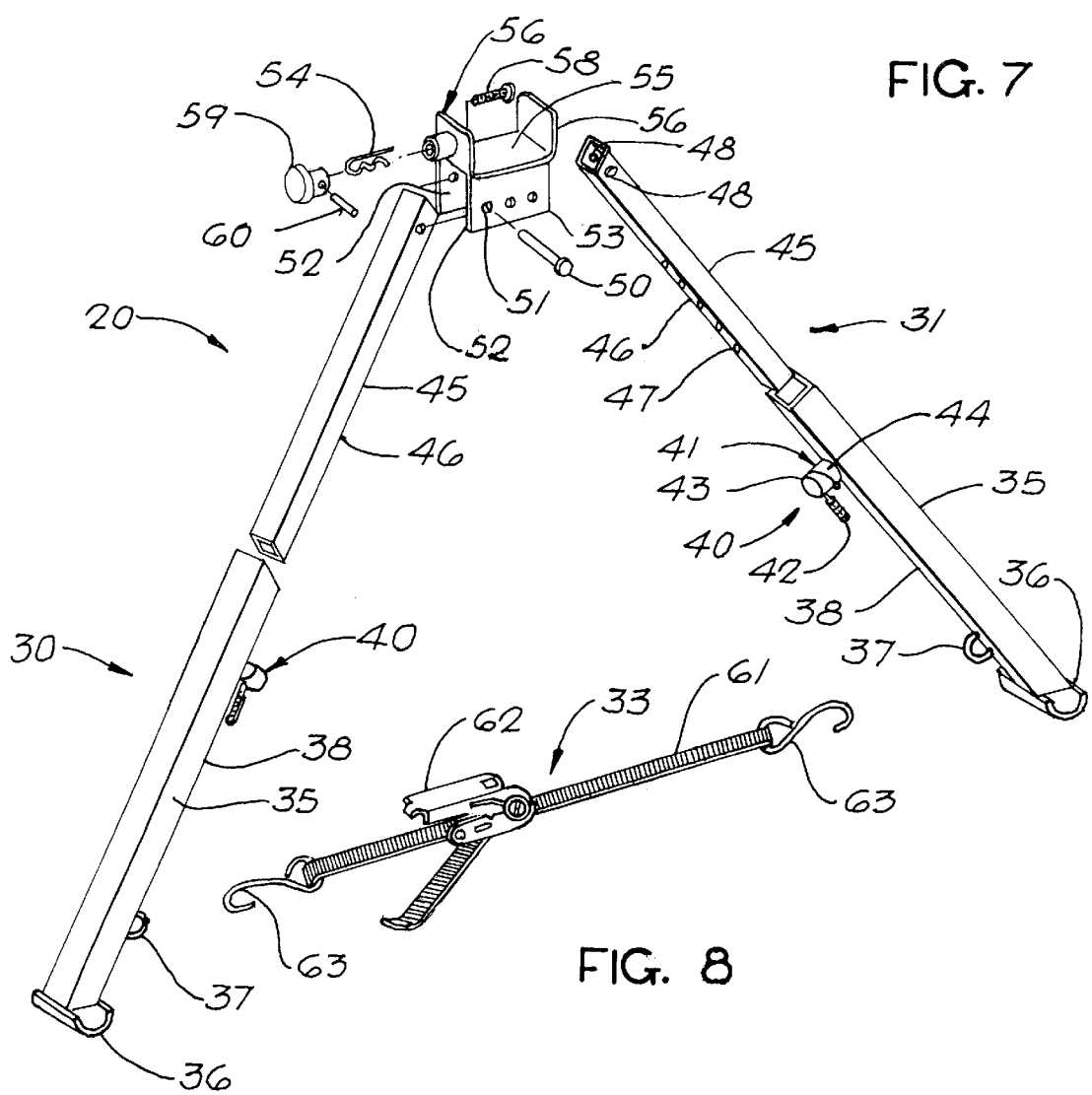

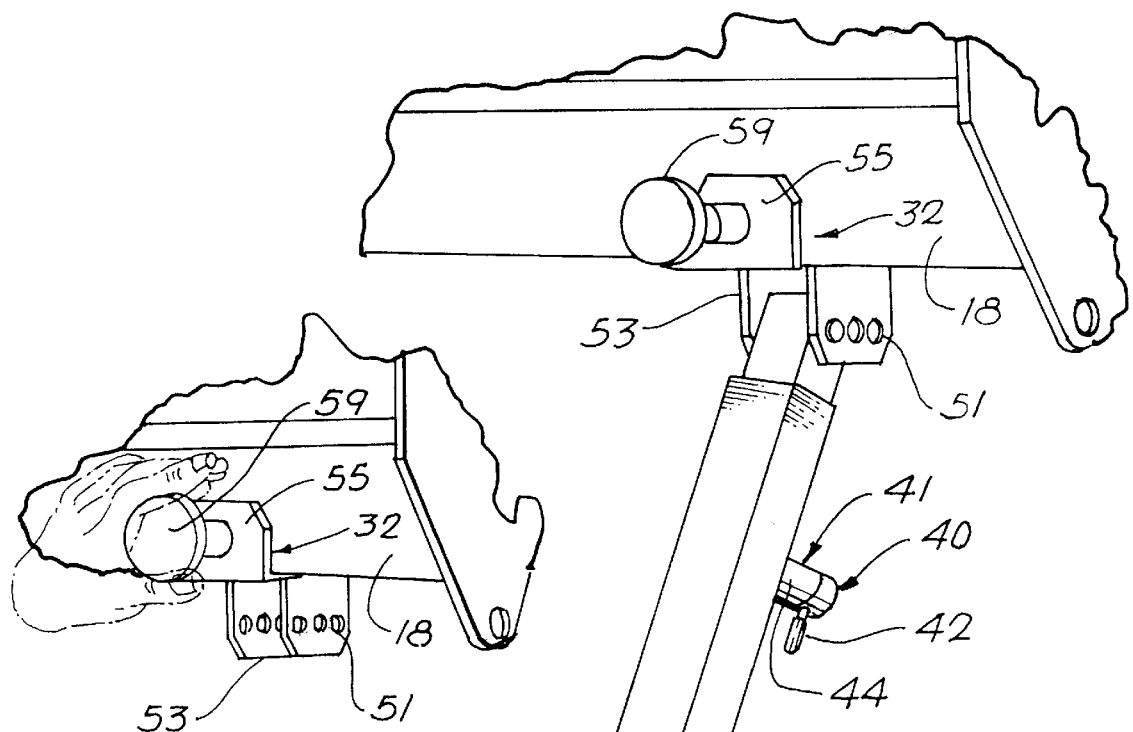
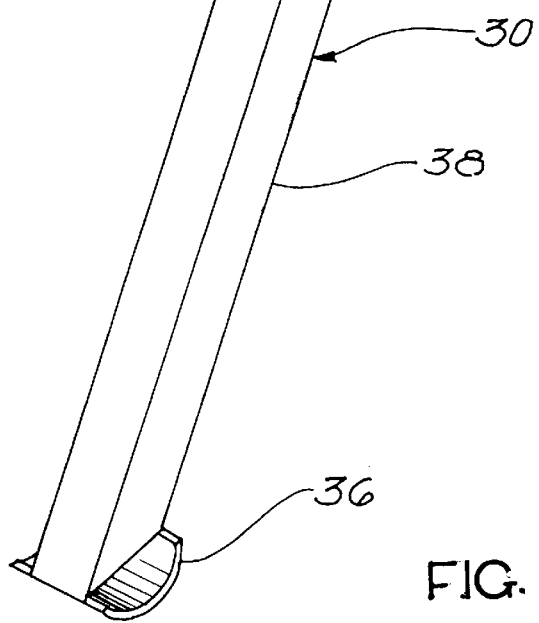
FIG. 9
FIG. 10

RECREATION VEHICLE STABILIZING SYSTEM

This invention is generally related to stabilization apparatus particularly used to stabilize expansion or slide out compartments of a recreational vehicle or trailer.

BACKGROUND OF THE INVENTION

Stabilizer jack-type support legs are well known devices used for supporting I-beam structures. The legs are installed in vertical position sometimes using adjusting holes or hitch pins to hold the leg devices in place. In many instances a jack-type leg embodies vertical, straight up and down pipe or a rigid tube for the purpose of undersupporting a tube type frame system of a recreational vehicle, for example.

Another type of device used for this purpose is a triangular support frame which employs different length support legs to meet various ground elevations encountered in practice. A heavy chain tie extends between the outer ends of the support legs and the legs are axially adjusted by screw means to engage the support framework. The extension of the leg adjustment bolt or thread, however, serves to vertically raise and thrust against the engaged support structure of the recreational vehicle. This jacking action can bend or damage the support structure, particularly the so called slide tubes of a slide out compartment utilized to expand the interior space of a recreational vehicle.

SUMMARY OF THE INVENTION

This invention is directed to improvements in stabilization devices for the purpose of avoiding the aforenoted shortcomings of the prior art by providing an improved and simplified stabilization support comprising a square cross section tubular housing having an inner removable square slide tube provided with spaced holes in at least one tube wall cooperable with a spring-loaded pin attached to the tubular housing to allow for multiple length adjustment of the inner slide tube. Such an adjusting leg formed by the two coaxially interfitting tubes has the outer end of the inner slide tube pivotally pinned to a removable U-shaped mounting bracket clamped to one or more of the support tubes of the particular slide out compartment utilized in the recreational vehicle. Two adjusting stabilizer legs normally are associated with each mounting bracket and aligned in co-planar relation to extend divergently outward from the bracket at substantially 450 angles so that slide shoes at the lower ends of such legs are in ground engagement. A flexible strap is attached between the angularly positioned adjusting legs; the strap being fitted with means for adjusting the length thereof to remove slack between the spread stabilizer legs without jacking or elevating the engaged slide-out support.

It is an important object of this invention to provide an improved telescopic tubular support leg capable of being adjusted to selected lengths.

Another important object of this invention is to provide a tubular, telescopic support leg as set out in the preceding object which is capable of being locked in various selected axial positions by utilization of a cam actuated pin assembly.

A still further object of this invention is to provide an improved stabilizing system for use with slide out compartments of a recreational vehicle, house trailer or the like which provides improved economies of production, ease of assembly and dependability of operation.

Having described this invention, the above and further objects, features and advantages thereof will be recognized by those skilled in the art from the following detailed description of preferred embodiments thereof illustrated in the accompanying drawings and representing the best mode presently contemplated for enabling those with normal skill in the art to make and practice this invention.

IN THE DRAWINGS

FIG. 7 is an exploded perspective of the stabilizer apparatus of this invention;

FIG. 8 is a perspective view of a ratchet tensioner strap employed between the ground engaging legs of the apparatus shown in FIGS. 5–7;

FIG. 9 is a perspective view of the mounting bracket shown in FIG. 7, illustrating the procedure for mounting the same on a slide-rail; and FIG. 10 is an enlarged perspective view showing a single stabilizer leg fitted to a mounting bracket shown in FIG. 9.

DESCRIPTION OF THE PREFERRED EMBODIMENT

With initial reference to FIGS. 1–4, the application of this invention to circumstances typically encountered in recreational vehicles, house trailers, mobile homes and the like will be recognized.

Figures 1, 2:
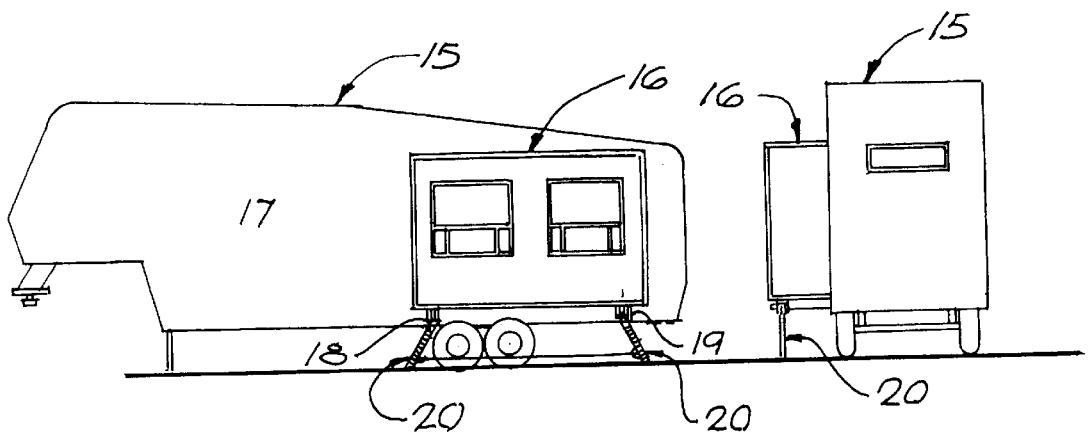
FIG. 1 is a schematic side elevational view of a house trailer having a two rail slide-out compartment extending from one side of the trailer and equipped with ground engaging stabilizer apparatus according to this invention.
FIG. 2 is a right-hand end elevation of the trailer shown in FIG. 1.

As shown, the house trailer in FIGS. 1 and 2 is equipped with a slide-out component 16 adapted to move outwardly of one side wall 17 of the trailer for the purpose of expanding the interior space of the trailer. This expansion facility is useful only when the trailer is parked. As illustrated, the slide-out compartment 16 is undersupported by dual slide-out track and rail structures designated 18 and 19 in FIG. 1. Once extended, compartment 16 is prone to laterally sway and rock especially when occupants move about its interior unless it is stabilized against such unwanted movement. As shown a stabilizer apparatus 20 of this invention is employed for this purpose as will be explained more fully presently.

Figure 3:
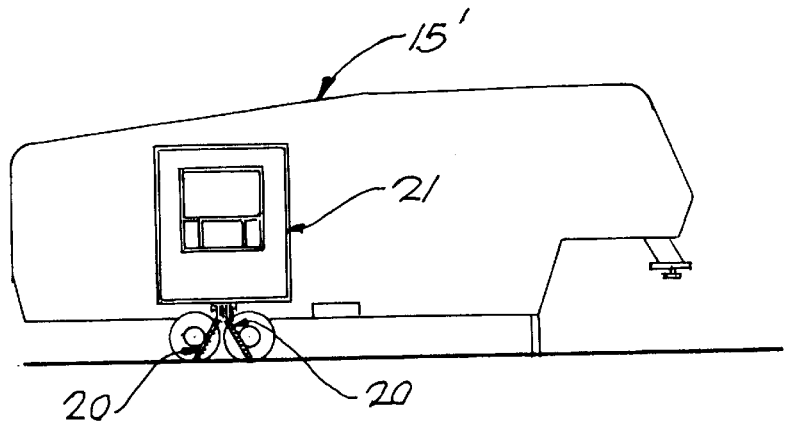
FIG. 3 is another schematic side elevation of a house trailer, similar to FIG. 1, having two single rail slide-out compartments extending from opposite sides of the trailer equipped with ground engaging stabilizer apparatus according to this invention.
Figure 4:
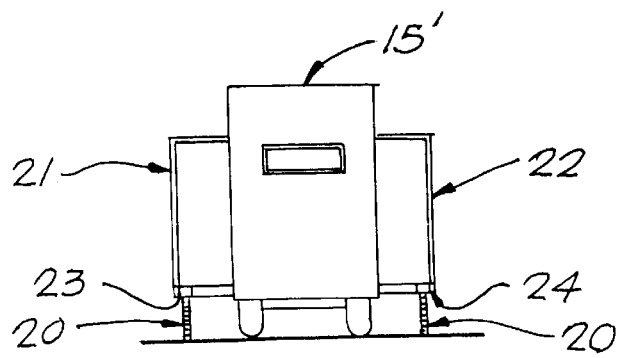
FIG. 4 is a right hand end elevation of the trailer shown in FIG. 3.

In another instance, as shown in FIGS. 3 and 4, house trailer 15', is equipped with two slide-out compartments 21, 22 extending from opposite sides of the trailer; under supported on single slide-out track and rail structures 23 and 24, respectively. In this arrangement, a single stabilizer apparatus 20 is associated with each of the structure 23 and 24, as will be amplified hereinafter.

Figure 6:
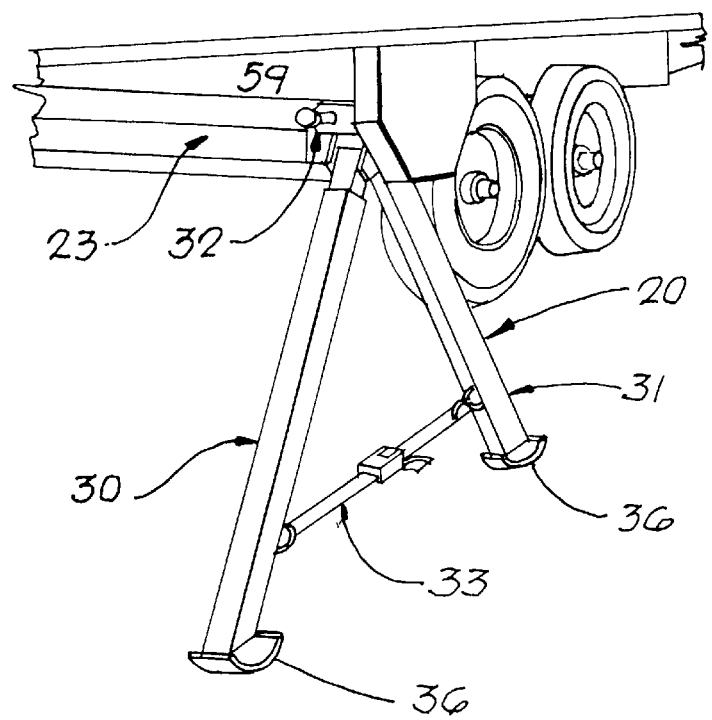
FIG. 6 is an enlarged perspective view, similar to FIG. 5, showing the operational relationship of the stabilizer apparatus of this invention with a single slide-out shown in FIGS. 3 and 4.
Figure 5:
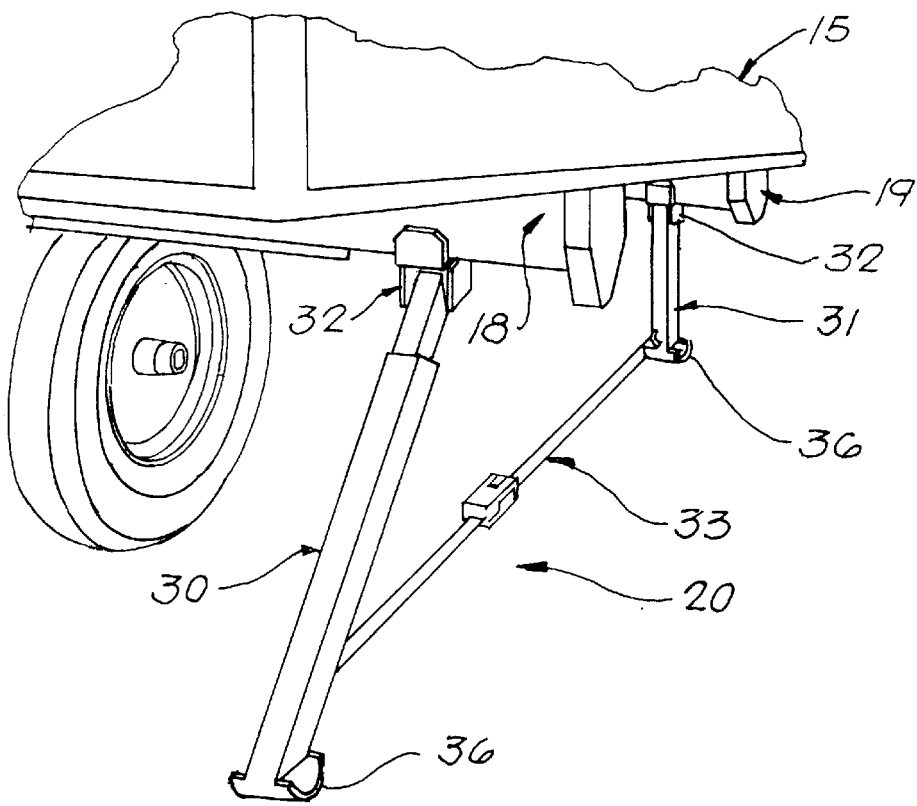
FIG. 5 is an enlarged partial perspective view showing the arrangement of the stabilizer apparatus of this invention in operational relation to the dual slide-out of FIGS. 1 and 2.

As shown best in FIGS. 5 and 6 respectively, the use of the stabilizer apparatus 20, of this invention for the dual track and rail structure of FIGS. 1 and 2 and its use with single track and rail structures, as set out in FIGS. 3 and 4 are more clearly illustrated. In each such use instance, the same stabilizer apparatus is employed.

With reference to FIGS. 7 and 8, the details of the stabilizer apparatus 20 hereof are set forth.

As shown, stabilizer apparatus 20 comprises a pair of identical extensibly adjustable legs 30, 31; a central mounting bracket 32 and a ratchet style strap tensioner 33.

Legs 30, 31 each comprise a square, tubular, relatively heavy metal base tube 35 having curved slide shoe 36 fixed over its ground engaging outer end. A tie-eye or ring 37 is provided on opposing inner faces 38 of the base tube for cooperation with the tensioner 33, as will appear hereinafter.

Also mounted on inner face 38 of each tube 35 is a spring based locking pin assembly 40 having an angularly split body 41 and a projecting operating handle 42 for manually rotating the axially outermost body part 43 to coaxially move an attached cylinder lock pin in a withdrawn or non-locking position; the pin (not shown) being coaxially fixed to the outer body part 43 while the remaining portion 44 is welded to face 38.

An adjustment tube 45 of square cross section is sized to closely telescopically fit into the interior of the square base tube 35 for coaxial sliding adjustment relative to the base tube. One face wall 46 of the tube 45 or two opposed face walls, if desired, are provided with spaced openings 47 which are selectively engageable with the locking pin of the related locking pin assembly 40. Thus axial adjustment of the two legs 30 and 31 may take place as needed to accommodate the length of the legs to the terrain encountered in use.

It will be noted that each adjustment tube 45 has a pair of registeringly aligned cylindrical openings 48, 48 adjacent its outer end, which are engageable by a cylindrical hitch pin 50 adapted to pass through openings 48 in tube 45 and selected openings 51 in depending parallel ear portions 52 of an inverted U-bracket 53 whereby the legs 30, 31 may be pivotally joined to the mounting bracket 32. Once assembled, each pin 50 is axially restrained by a retaining clip 54, which fits through an opening near the outer end of pin 50.

The mounting bracket 32 includes a second U-shaped upper bracket portion 55 fixed to the upper side of bracket portion 53 so that parallel ear portions 56, thereof align at right angles to ear portions 52. A cylindrical boss 57 is welded to the outside of one of the ears 56 opposite an opening (not shown) for passage of the threaded body of a tensioner pad 58. The interior of the boss 57 is threaded to engage the threaded body of the tensioner pad and an operating handle 59 is fixed to the tensioner pad body by a roll pin 60 to clamp the pad 58 against a slide support.

The strap tensioner 33 preferably is a conventional ratchet type come-along having an adjustable or relatively elastic, stretchable material such as Nylon strap 61 equipped with hooks 62 at its opposite ends and a ratchet mechanism 62 intermediate its ends. Hooks 63 are designed to engage the eye rings 37 of the two leg members 30, 31 in operation. Since the strap is of woven nylon or an equivalent material, if the ground engaged by the leg foot pads, should settle strap 61 will stretch to accommodate increased separation of the legs.

In the norm if an A-frame configuration of the stabilizer apparatus is used, as in the FIG. 6 illustration, then the legs 30, 31 preferably are aligned at 45° to the vertical on opposite sides of the bracket 32. Outer ends of the two legs are engaged with the ground and if the terrain requires it, adjustment of the leg lengths is made to assure a good stable footing for the stabilizer. Once so aligned, and with bracket 32 secured to the undercarriage slide or tube as shown in FIGS. 6, 9 and 10, tensioning of the strap 61 by exercising the ratchet mechanism 62 serves to tightly thrust or press the hitch pins 50 against the ears 52 of the mounting bracket 32 eliminate lateral sway or movement of the slide out structure without.

Similarly, as illustrated in FIGS. 1 and 5, when a dual slide compartment support is used, then the stabilizer 20 is rearranged in the manner illustrated in FIG. 5 to widely separate legs 30 and 31 and provide a mounting bracket 32 at the upper end of each leg. Thus one leg 30, for instance is mounted to one slide assembly 18 while the second leg 32 is coupled to slide assembly 19 as shown. Again, the legs are angled at 45–60° from the vertical and divergently arranged and adjusted lengthwise so that the shoes 36 engage the terrain to provide a level support. Tensioning of the ratchet tensioner connected between the lower ends of the spread legs 30, 31 serves to press the upper ends thereof tightly against the mounting brackets to laterally brace the two slide assemblies and stabilize the slide out compartment against lateral sway as desired.

As best in FIGS. 9 and 10, brackets 32 are removeably secured to a structural slide rail, such as rod 18 by placing the spaced ears 56 on opposite sides of the slide member and the tightening the tensioner pad against one side of the slide member by manipulating the handle 59 to tightly clamp the bracket to the slide.

Because the brackets are removable, such may be removed or mounted easily as desired.

From the foregoing, it is believed that those familiar with the art will readily appreciate the novel advancement of this invention over the prior art and will recognize that while the foregoing disclosure is directed to a preferred embodiment shown in the accompanying drawings the same is readily subject to change, modification and substitution of equivalents without departing from the invention which is intended to be unlimited except as may appear in the following appended claims.

The embodiments of the invention in which an exclusive property or privilege is claimed are defined as follows:

1. Apparatus for stabilizing parked recreational vehicles, having one or more slide-out compartments undersupported by slide out tube and rail structures, said apparatus comprising:

a pair of identical telescopically adjustable legs each having an upper end and a lower end;

each leg comprising an elongated base tube and an adjustment tube intermated with the interior of said base tube for coaxial sliding movement in and out of the upper end of said base tube;

a manually operable, spring biased, axially moveable latch bolt secured to the outside of said base tube for engaging selected spaced openings formed in an associated said adjustment tube whereby to selectively adjust the length of each said leg;

a pair of mounting brackets each having manually operable means for securely clamping the same to an under supporting slide-out tube and rail structure; each said mounting bracket having a pair of U-shaped brackets interjoined so that arms therof extend in opposite directions and are aligned at right angles to one another;

flexible ratchet operated strap means tensioned between and coupled to said legs adjacent lower ends thereof to maintain the divergent position of said legs and laterally stabilize an associated slide tube and rail structure.

2. Apparatus for stabilizing parked recreational vehicles, having one or more slide-out compartments supported on slide-out tube and rail structures, said apparatus comprising:

a pair of identical telescopically, adjustable tubular legs, each having an upper end and a lower end;

each leg comprising an elongated base tube, a slide shoe fixed to its lower end and a manually operable spring actuated latch bolt axially moveable laterally through one side of said base tube;

an adjustment tube matingly interfitted with the interior of the base tube for coaxial sliding movement relative to said base tube;

said adjustment tube having plural spaced means receptive of said latch bolt whereby to determine selected axial positions of said adjustment tube relative to said base tube;

a pair of mounting brackets each having manually operable means for securely clamping the same to an undersupporting slide-out tube and rail structure;

each said mounting bracket having a pair of U-shaped brackets interjoined so that arms thereof extend in opposite directions and are aligned at right angles to one another;

pivot means pivotally interconnecting the outer end of at least one of said leas to each said mounting bracket;

flexible strap means extending between lower ends of said legs associated with slide-out tube and rail structures; and a strap tensioning means operable to tension said strap means whereby to cause said legs to stabilize said tube and rail structures against lateral movements.

* * * * *

UNITED STATES PATENT AND TRADEMARK OFFICE
CERTIFICATE OF CORRECTION

PATENT NO. : 6,142,488
DATED : November 7, 2000
INVENTOR(S) : David G. Orr

It is certified that error appears in the above-identified patent and that said Letters Patent is hereby corrected as shown below:

Col. 1, Line 47 - "450" should be "45°"

Col. 3, Line 59 - first "62" should be "63"

Col. 4, Line 65 - "therof" should be corrected to "thereof"

Col. 6, Line 11 - "leas" should be corrected to "legs"

Signed and Sealed this

First Day of May, 2001

Attest:

NICHOLAS P. GODICI

Attesting Officer   Acting Director of the United States Patent and Trademark Office